US012586509B2

(12) United States Patent
Lin et al.

(10) Patent No.: US 12,586,509 B2
(45) Date of Patent: Mar. 24, 2026

(54) DISPLAY APPARATUS, DISPLAY DRIVING DEVICE AND DRIVING METHOD

(71) Applicant: Novatek Microelectronics Corp., Hsinchu (TW)

(72) Inventors: Kun-Zheng Lin, Hsinchu City (TW); Huan-Teng Cheng, Hsinchu City (TW); Shuo-Wen Jang, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 78 days.

(21) Appl. No.: 18/427,754

(22) Filed: Jan. 30, 2024

(65) Prior Publication Data

US 2025/0246117 A1 Jul. 31, 2025

(51) Int. Cl.
*G09G 3/20* (2006.01)

(52) U.S. Cl.
CPC ....... *G09G 3/2096* (2013.01); *G09G 2310/08* (2013.01); *G09G 2340/0414* (2013.01)

(58) Field of Classification Search
CPC ...... G09G 3/2096; G09G 3/22; G09G 3/3208; G09G 5/14; G09G 5/227; G09G 2310/04; G09G 2310/08; G09G 2320/0686; G09G 2340/0407; G09G 2340/0428; G09G 2340/0414
See application file for complete search history.

(56) References Cited

U.S. PATENT DOCUMENTS 7,456,836 B2 * 11/2008 Mamiya ................. G09G 5/005 345/1.3
7,952,554 B2 * 5/2011 Awakura ................ G09G 5/397 345/204

(Continued)

FOREIGN PATENT DOCUMENTS

CN 112086022 12/2020
TW 201905641 2/2019

(Continued)

OTHER PUBLICATIONS

"Office Action of Taiwan Related Application, Application No. 113125826", issued on Mar. 31, 2025, p. 1-p. 6.

(Continued)

*Primary Examiner* — Vijay Shankar
(74) *Attorney, Agent, or Firm* — JCIPRNET

(57) ABSTRACT

The display driving device includes an interface circuit and a control circuit. The interface circuit receives a display data frame from a data stream provided by a processor to the control circuit. In a full panel display mode, the display data frame includes first resolution display data corresponding to the entire display area of the display panel, and the control circuit drives a plurality of data lines of the display panel based on the first resolution display data. In a partial panel display mode, the display data frame includes second resolution display data corresponding to a first partial display area of the display panel (but does not include display data corresponding to other display area in the display panel (Continued)

except the first partial display area), and the control circuit driving the data lines based on the second resolution display data.

41 Claims, 10 Drawing Sheets

(56) References Cited

U.S. PATENT DOCUMENTS

| | | | | |
|---|---|---|---|---|
| 8,922,605 | B2 * | 12/2014 | Todoroki | G09G 5/363 345/698 |
| 9,875,522 | B2 * | 1/2018 | Urabe | G09G 5/003 |
| 10,504,442 | B2 | 12/2019 | Yoo | |
| 11,100,900 | B2 | 8/2021 | Park et al. | |
| 11,721,302 | B2 | 8/2023 | Lin et al. | |
| 2007/0291021 | A1 * | 12/2007 | Awakura | G09G 5/397 345/205 |
| 2008/0297542 | A1 * | 12/2008 | Todoroki | G09G 5/391 345/698 |
| 2017/0102738 | A1 | 4/2017 | Park et al. | |
| 2018/0088633 | A1 | 3/2018 | Whitman et al. | |
| 2019/0005884 | A1 | 1/2019 | Yoo | |
| 2019/0064950 | A1 | 2/2019 | Hsu | |
| 2020/0264826 | A1 | 8/2020 | Kwon et al. | |
| 2020/0394984 | A1 | 12/2020 | Park et al. | |
| 2021/0210047 | A1 | 7/2021 | Lin et al. | |
| 2022/0060572 | A1 | 2/2022 | Kwon | |
| 2022/0319388 | A1 | 10/2022 | Xian et al. | |
| 2023/0040998 | A1 * | 2/2023 | Xu | G09G 5/38 |

FOREIGN PATENT DOCUMENTS

| | | |
|---|---|---|
| TW | I652657 | 3/2019 |
| TW | 202127417 | 7/2021 |

OTHER PUBLICATIONS

"Office Action of Taiwan Counterpart Application", issued on Apr. 10, 2025, p. 1-p. 3.

"Office Action of U.S. Related Application, U.S. Appl. No. 18/672,037", issued on Feb. 11, 2026, p. 1-p. 27.

* cited by examiner

DISPLAY APPARATUS, DISPLAY DRIVING DEVICE AND DRIVING METHOD

BACKGROUND

Field of the Disclosure

The present disclosure relates to an electronic device, and in particular, to a display apparatus, a display driving device and a driving method.

Description of Related Art

Display panels have been commonly adopted in various types of electronic devices. The display panel may need to operate in different display modes in different operation scenarios. For example, the display panel may be selectively operated in either a full panel display mode or a partial panel display mode. In the full panel display mode, the entire display area of the display panel is utilized to display various information. In the partial panel display mode, part of the display area (normal active area) of the display panel is utilized to display various information, while another part of the display area (inactive area) of the display panel is utilized to display any unimportant images (e.g., black screen). Generally speaking, no matter which display mode the display panel is operated in, the application processor (AP) will transmit the full-frame display data (high-resolution display data) corresponding to the entire display area of the display panel to the display driving device. That is, the display driving device performs various image processing on the full-frame display data corresponding to all display areas, and then drives multiple data lines of the display panel based on the processed display data. Based on the actual design, the image processing performed by the display driving device on the display data may include logical operations, image enhancement or other processing, such as: De-mura, Deburn-in, color enhancement and other image processing.

In partial panel display mode, the display data corresponding to the inactive area of the display panel (unimportant images, such as black screen) will occupy the transmission bandwidth. Furthermore, the display driving device will perform various image processing on the display data in the inactive area, but performing various image processing on the unimportant images (such as black screen) in the inactive area will consume/waste the computing resources and power consumption of the display driving device, and will take up a large amount of storage resources of the display driving device.

SUMMARY OF THE DISCLOSURE

The present disclosure provides a display apparatus, a display driving device and a driving method to be selectively operated in either a full panel display mode or a partial panel display mode.

In an embodiment of the present disclosure, the display driving device is disposed to drive the display panel. The display driving device includes an interface circuit and a control circuit. The interface circuit receives a data stream from a processor. The data stream includes a display data frame and vertical synchronization information. The control circuit is coupled to the interface circuit to receive the vertical synchronization information and the display data frame. In response to the display panel operating in the full panel display mode, the display data frame received by the control circuit from the interface circuit contains the first resolution display data corresponding to the entire display area of the display panel, and the control circuit drives multiple data lines of the display panel based on the first resolution display data. In response to the display panel operating in the first partial panel display mode, the display data frame received by the control circuit from the interface circuit contains the second resolution display data corresponding to the first partial display area of the display panel (but not include the display data corresponding to other display areas in the display panel except the first partial display area), and the control circuit drives the data lines based on the second resolution display data, wherein the resolution of the second resolution display data is lower than the resolution of the first resolution display data.

In an embodiment of the present disclosure, the driving method includes: receiving a data stream from the processor by an interface circuit of the display driving device, wherein the data stream includes a display data frame and vertical synchronization information; in response to the display panel operating in the full panel display mode, the control circuit of the display driving device receives a display data frame containing the first resolution display data corresponding to the entire display area of the display panel from the interface circuit, and the control circuit drives multiple data lines of the display panel based on the first resolution display data; and in response to the display panel operating in the first partial panel display mode, the control circuit receives a display data frame containing the second resolution display data (but not include the display data corresponding to other display areas in the display panel except the first partial display area) corresponding to the first partial display area of the display panel from the interface circuit, and the control circuit drives the data lines based on the second resolution display data, wherein the resolution of the second resolution display data is lower than the resolution of the first resolution display data.

In an embodiment of the present disclosure, the display apparatus includes a processor, a display panel and a display driving device. The display driving device is disposed to drive the display panel. The display driving device is coupled to the processor to receive a data stream. The data stream includes a display data frame and vertical synchronization information. In response to the display panel operating in the full panel display mode, the display data frame received by the display driving device from the processor contains the first resolution display data corresponding to the entire display area of the display panel, and the display driving device drives multiple data lines of the display panel based on the first resolution display data. In response to the display panel operating in the first partial panel display mode, the display data frame received by the display driving device from the processor contains the second resolution display data corresponding to the first partial display area of the display panel (but not include the display data corresponding to other display areas in the display panel except the first partial display area), and the display driving device drives the data lines based on the second resolution display data, wherein the resolution of the second resolution display data is lower than the resolution of the first resolution display data.

Based on the above, the display apparatus according to the embodiments of the present disclosure may be operated in either the full panel display mode or the partial panel display mode. When the display panel is operated in the first partial panel display mode, the display data frame received by the display driving device from the processor does not contain display data corresponding to other display areas (inactive areas) except the first partial display area (normal active area). Therefore, the amount of data transmitted between the processor and the display driving device and the amount of data transmitted between the display driving device and the display panel may be effectively reduced. Furthermore, because the display data frame does not include display data in the inactive area, the display driving device does not need to perform various image processing on the display data in the inactive area, thereby avoiding consumption/waste of computing resources and power consumption.

In order to make the above-mentioned features and advantages of the present disclosure more obvious and easy to understand, embodiments are given below and described in detail with reference to the attached drawings.

DESCRIPTION OF EMBODIMENTS

Figure 1:
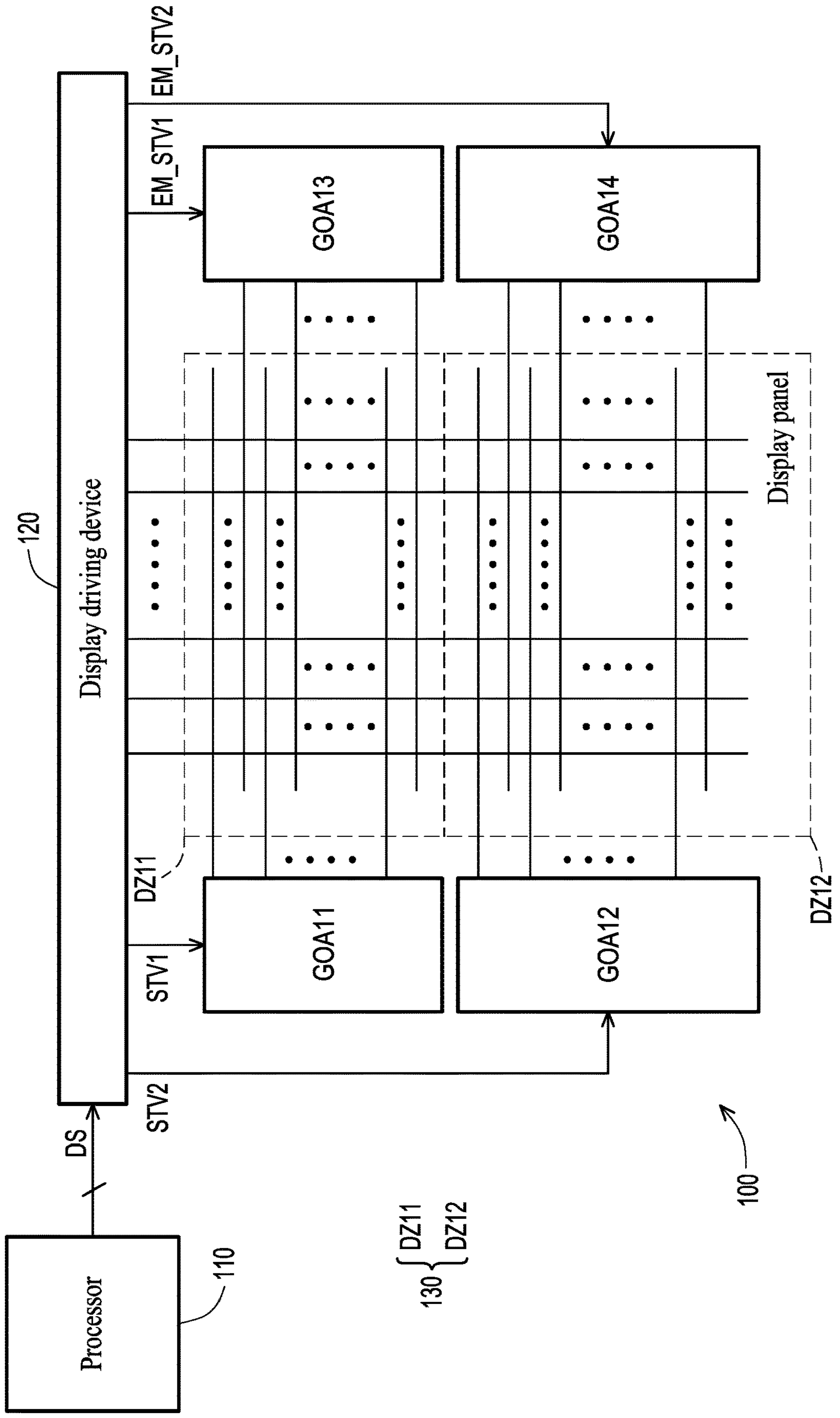
FIG. 1 is a circuit block diagram of a display apparatus according to an embodiment of the present disclosure.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the present disclosure (including claims) are used to name elements or to distinguish different embodiments or scopes, neither to be used to limit upper or lower limit of the number of elements nor limit the sequence of the elements. In addition, wherever possible, elements/components/steps with the same reference numbers are used in the drawings and embodiments to represent the same or similar parts. Elements/components/steps using the same numbers or using the same terms in different embodiments may serve as cross-reference for each other.

FIG. 1 is a circuit block diagram of a display apparatus 100 according to an embodiment of the present disclosure. The display apparatus 100 shown in FIG. 1 includes a processor 110, a display driving device 120 and a display panel 130. This embodiment does not limit the specific implementation of the display panel 130. According to the actual design, the display panel 130 may be an organic light-emitting diode (OLED) display panel or other display panels. The display panel 130 includes a partial display area DZ11 and a partial display area DZ12.

The display panel 130 is provided with a gate scanning circuit GOA11, a gate scanning circuit GOA12, an emission scanning circuit GOA13 and an emission scanning circuit GOA14. According to the actual design, the gate scanning circuit GOA11, the gate scanning circuit GOA12, the emission scanning circuit GOA13 and/or the emission scanning circuit GOA14 may include a gate driver-on-array (GOA) or other scanning circuits. The gate scanning circuit GOA11 is coupled to multiple gate lines (gate scanning lines) in the partial display area DZ11, and the gate scanning circuit GOA12 is coupled to multiple gate lines (gate scanning lines) in the partial display area DZ12. The emission scanning circuit GOA13 is coupled to multiple emission scanning lines in the partial display area DZ11, and the emission scanning circuit GOA14 is coupled to the multiple emission scanning lines in the partial display area DZ12.

This embodiment does not limit the specific implementation of the processor 110. Depending on the actual design, the processor 110 may include an application processor (AP) or other processors. The display driving device 120 is coupled to the processor 110 to receive the data stream DS. For example (but not limited thereto), the processor 110 may output the data stream DS to the display driving device 120 through a mobile industry processor interface (MIPI). The display driving device 120 may retrieve the display data frame and vertical synchronization information from the data stream DS provided by the processor 110. The display driving device 120 may drive the display panel 130 to display images based on the display data frame. According to different designs, in some embodiments, the display driving device 120 may be implemented as a hardware circuit. In other embodiments, the display driving device 120 may be implemented in a combination of hardware, firmware, and software (i.e., program).

In terms of hardware, the display driving device 120 may be implemented as a logic circuit on an integrated circuit. For example, the related functions of the display driving device 120 may be implemented in one or more controllers, microcontrollers, microprocessors, application-specific integrated circuits (ASICs), digital signal processor (DSP), field programmable gate array (FPGA), central processing unit (CPU) and/or other logic blocks, modules and circuits in processing units. The related functions of the display driving device 120 may be implemented as hardware circuits using hardware description languages (such as Verilog HDL or VHDL) or other suitable programming languages, such as various logic blocks, modules and circuits in integrated circuits.

In terms of implementation in the form of software and/or firmware, the related functions of the above display driving device 120 may be implemented as programming codes. For example, the display driving device 120 is implemented using general programming languages (such as C, C++ or combination language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic device (such as a CPU, a controller, a microcontroller or a microprocessor) may read and execute the programming code from the non-transitory machine-readable storage medium, thereby realizing the related functions of the display driving device 120.

The display driving device 120 is coupled to the multiple data lines of the display panel 130. In response to the display panel 130 operating in the full panel display mode, the display data frame received by the display driving device 120 from the processor 110 contains high-resolution display data (first resolution display data) corresponding to the entire display area of the display panel 130. Under the circumstances, the display driving device 120 may drive the data lines of the display panel 130 based on the first resolution display data.

In response to the display panel 130 operating in the partial panel display mode (for example, the first partial panel display mode), the display data frame received by the display driving device 120 from the processor 110 contains the low-resolution display data (the second resolution display data, the resolution of the second resolution display data is lower than the resolution of the first resolution display data) corresponding to the partial display area (normal active area, such as the first partial display area) of the display panel 130, but does not contain the display data corresponding to other display areas (inactive areas) in the display panel 130 except the first partial display area. Under the circumstances, the display driving device 120 may drive the data lines of the display panel 130 based on the second resolution display data.

In response to the display panel 130 operating in another partial panel display mode (for example, the second partial panel display mode), the display data frame received by the display driving device 120 from the processor 110 contains the low-resolution display data (the third resolution display data, the resolution of the third resolution display data is lower than the resolution of the first resolution display data) corresponding to another partial display area (normal active area, such as the second partial display area) of the display panel 130, but does not contain the display data corresponding to other display areas (inactive areas) in the display panel 130 except the second partial display area. Under the circumstances, the display driving device 120 may drive the data lines of the display panel 130 based on the third resolution display data.

For example, when the display panel 130 is operated in a certain "partial panel display mode", the partial display area DZ11 is a normal active area and the partial display area DZ12 is an inactive area. Therefore, the display data frame received by the display driving device 120 from the processor 110 contains the low-resolution display data corresponding to the partial display area DZ11 (but not contain the display data corresponding to the partial display area DZ12). Under the circumstances, the display driving device 120 may drive the data lines of the display panel 130 based on the low-resolution display data corresponding to the partial display area DZ11. When the display panel 130 is operated in another "partial panel display mode", the partial display area DZ12 is a normal active area and the partial display area DZ11 is an inactive area. Therefore, the display data frame received by the display driving device 120 from the processor 110 contains the low-resolution display data corresponding to the partial display area DZ12 (but not contain the display data corresponding to the partial display area DZ11). Under the circumstances, the display driving device 120 may drive the data lines of the display panel 130 based on the low-resolution display data corresponding to the partial display area DZ12.

In summary, the display apparatus 100 may be selectively operated in either the full panel display mode or the partial panel display mode. When the display panel 130 is operated in the first partial panel display mode, the display data frame received by the display driving device 120 from the processor 110 does not contain display data corresponding to other display areas (inactive areas) except the normal active area. Therefore, the amount of data transmitted between the processor 110 and the display driving device 120 and the amount of data transmitted between the display driving device 120 and the display panel 130 may be effectively reduced. Furthermore, because the display data frame does not include display data in the inactive area, the display driving device 120 does not need to perform various image processing on the display data in the inactive area, thereby avoiding consumption/waste of computing resources and power consumption.

Figure 2:
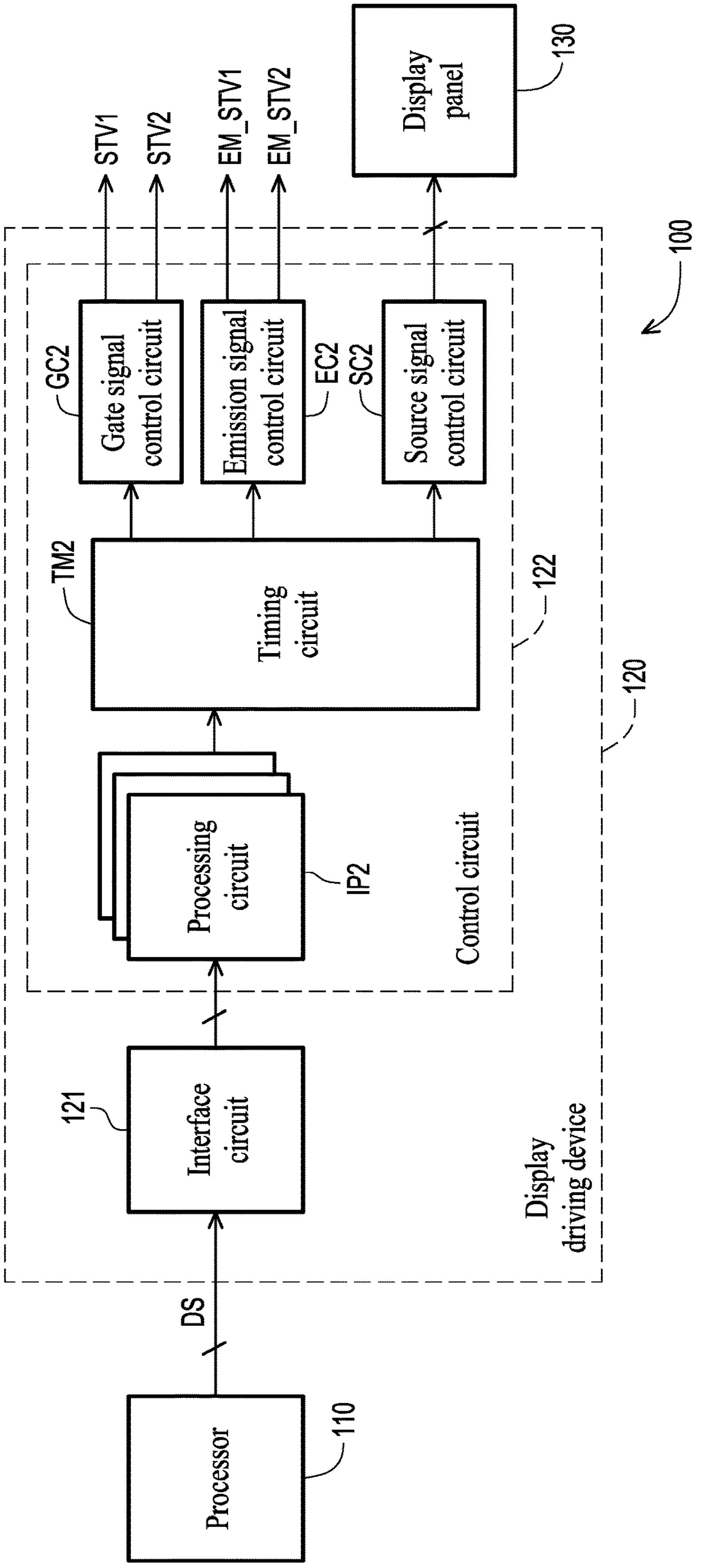
FIG. 2 is a circuit block diagram of a display driving device according to an embodiment of the present disclosure.

FIG. 2 is a circuit block diagram of a display driving device 120 according to an embodiment of the present disclosure. For the description of the display apparatus 100, the processor 110, the display driving device 120 and the display panel 130 shown in FIG. 2, please refer to the relevant description of the display apparatus 100, the processor 110, the display driving device 120 and the display panel 130 shown in FIG. 1. In the embodiment shown in FIG. 2, the display driving device 120 includes an interface circuit 121 and a control circuit 122. The interface circuit 121 is coupled to the processor 110 to receive the data stream DS. The interface circuit 121 is also coupled to the control circuit 122.

Figure 3:
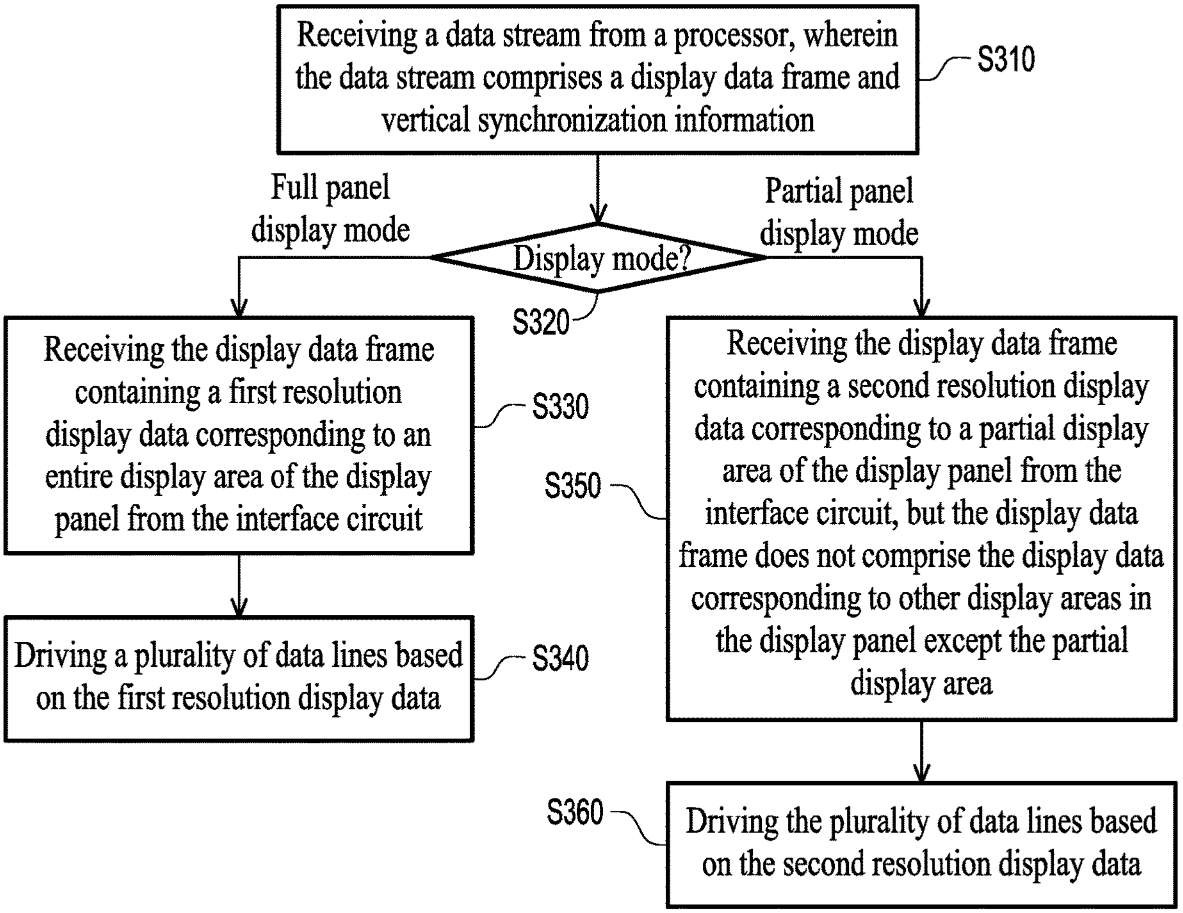
FIG. 3 is a schematic flowchart of a driving method of a display driving device according to an embodiment of the present disclosure.

FIG. 3 is a schematic flowchart of a driving method of a display driving device 120 according to an embodiment of the present disclosure. Referring to FIG. 2 and FIG. 3, in step S310, the interface circuit 121 receives a data stream DS from the processor 110, wherein the data stream DS includes a display data frame and vertical synchronization information. The interface circuit 121 retrieves the display data frame and vertical synchronization information from the data stream DS and provides them to the control circuit 122. In response to the display panel 130 operating in the full panel display mode (that is, the determining result in step S320 is "full panel display mode"), the control circuit 122 receives a display data frame containing high-resolution display data (first resolution display data) corresponding to the entire display area of the display panel 130 from the interface circuit 121 (step S330).

Figure 4:
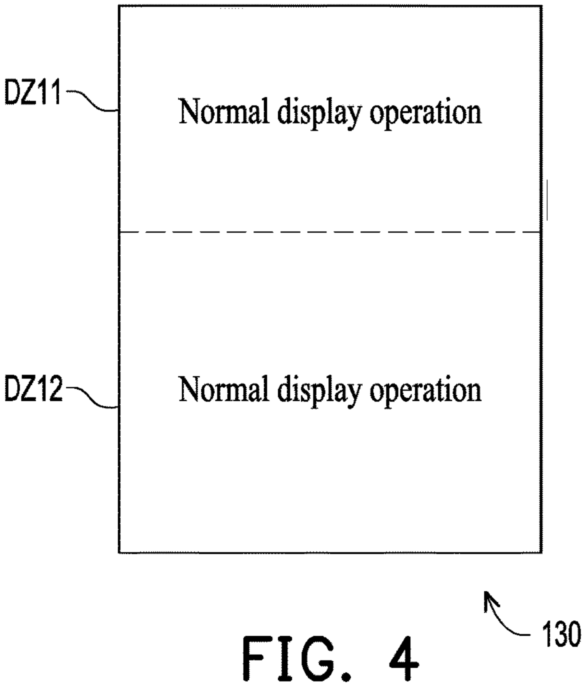
FIG. 4 is a schematic diagram illustrating a display panel operating in a full panel display mode according to an embodiment of the present disclosure.

FIG. 4 is a schematic diagram of a display panel 130 operating in a full panel display mode according to an embodiment of the present disclosure. Please refer to FIG. 2 and FIG. 4. When the display panel 130 is operated in the full panel display mode, the partial display areas DZ11 and DZ12 of the display driving device 120 are both normal active areas. The control circuit 122 receives the display data frame containing the first resolution display data corresponding to the entire display area (partial display areas DZ11 and DZ12) of the display panel 130 from the interface circuit 121. In step S340, the control circuit 122 drives the multiple data lines of the display panel 130 based on the first resolution display data. Therefore, the partial display areas DZ11 and DZ12 perform normal display operations.

Figure 5:
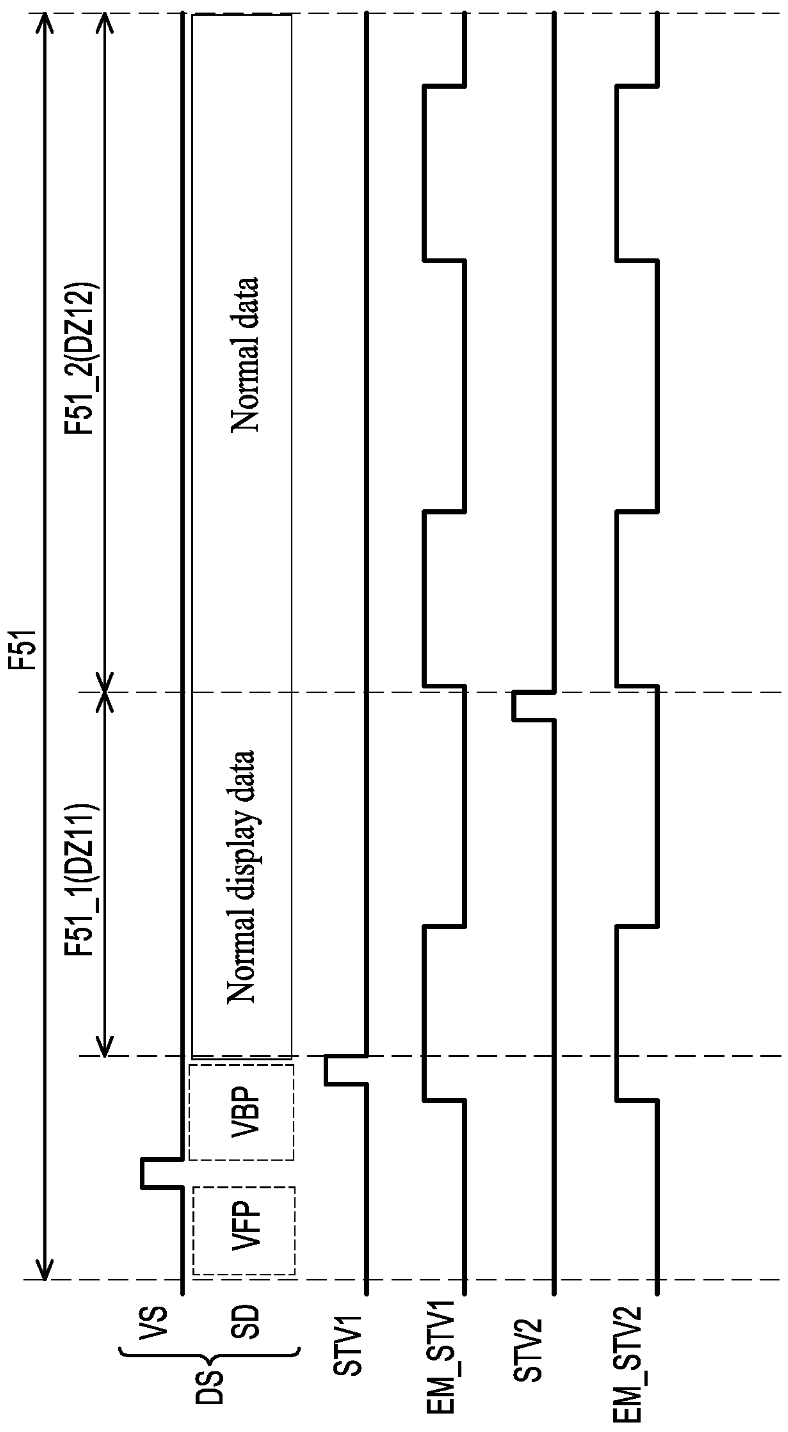
FIG. 5 is a signal timing diagram of a display driving device operating in a full panel display mode according to an embodiment of the present disclosure.

FIG. 5 is a signal timing diagram of the display driving device 120 operating in the full panel display mode according to an embodiment of the present disclosure. The horizontal axis in FIG. 5 represents time. Referring to FIG. 1, FIG. 2, FIG. 4 and FIG. 5, the interface circuit 121 may retrieve the display data frame SD and the vertical synchronization information VS from the data stream DS provided by the processor 110 and provide them to the control circuit 122. The vertical synchronization information VS defines a frame period, such as a frame period F51 shown in FIG. 5. The frame period F51 corresponding to the display data frame SD includes a porch period and a valid data period (scanning period), wherein the porch period includes a vertical front porch VFP and a vertical back porch VBP. In the full panel display mode, the valid data period (scanning period) includes a sub-frame scanning period F51_1 corresponding to the partial display area DZ11 and a sub-frame scanning period F51_2 corresponding to the partial display area DZ12.

The control circuit 122 provides the gate start pulse signal STV1 shown in FIG. 5 to the gate scanning circuit GOA11 corresponding to the partial display area DZ11, so as to trigger the gate scanning circuit GOA11 to perform gate scanning on the partial display area DZ11 during the sub-frame scanning period F51_1. The control circuit 122 provides the emission start pulse signal EM_STV1 to the emission scanning circuit GOA13 corresponding to the partial display area DZ11 to trigger the emission scanning circuit GOA13 to perform emission scanning on the partial display area DZ11 during the sub-frame scanning period F51_1. Therefore, the partial display area DZ11 may perform normal display operations in the full panel display mode.

The control circuit 122 provides the gate start pulse signal STV2 shown in FIG. 5 to the gate scanning circuit GOA12 corresponding to the partial display area DZ12, so as to trigger the gate scanning circuit GOA12 to perform gate scanning on the partial display area DZ12 during the sub-frame scanning period F51_2. The control circuit 122 provides the emission start pulse signal EM_STV2 to the emission scanning circuit GOA14 corresponding to the partial display area DZ12 to trigger the emission scanning circuit GOA14 to perform emission scanning on the partial display area DZ12 during the sub-frame scanning period F51_2. Therefore, the partial display area DZ12 may perform normal display operations in the full panel display mode.

Referring to FIG. 2 and FIG. 3, in response to the display panel 130 operating in the partial panel display mode (that is, the determining result in step S320 is the "partial panel display mode"), the display data frame received by the control circuit 122 from the interface circuit 121 contains low-resolution display data (second resolution display data) corresponding to the first partial display area (normal active area) of the display panel 130, but does not contain the display data corresponding to other display areas (inactive areas) in the display panel 130 except the first partial display area (step S350), wherein the resolution of the second resolution display data is lower than the resolution of the first resolution display data.

For example, in a certain partial panel display mode (for example, the first partial panel display mode), the display data frame received by the control circuit 122 contains low-resolution display data corresponding to the partial display area DZ11, but does not contain the display data corresponding to the partial display area DZ12. In another partial panel display mode (for example, the second partial panel display mode), the display data frame received by the control circuit 122 contains low-resolution display data corresponding to the partial display area DZ12, but does not contain the display data corresponding to the partial display area DZ11. In step S360, the control circuit 122 drives the multiple data lines of the display panel 130 based on the second resolution display data.

Figure 6:
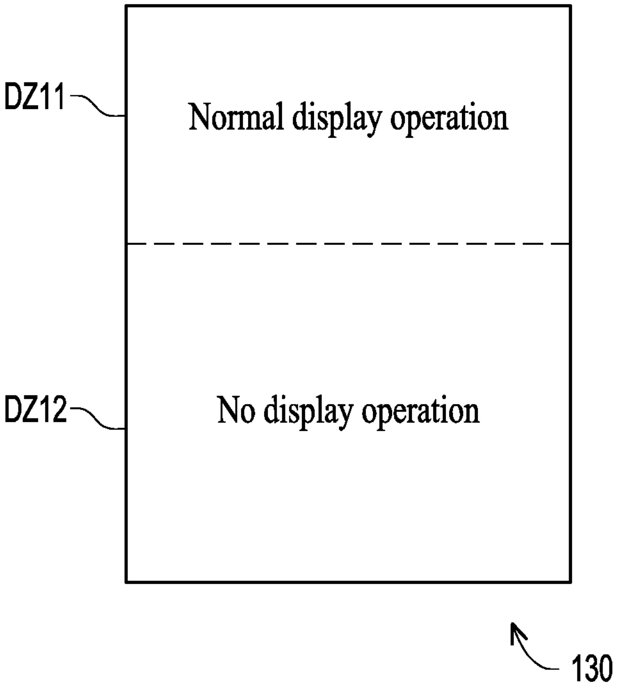
FIG. 6 is a schematic diagram illustrating a display panel operating in a partial panel display mode according to an embodiment of the present disclosure.

FIG. 6 is a schematic diagram illustrating a scenario where the display panel 130 is operated in a certain partial panel display mode (for example, the first partial panel display mode) according to an embodiment of the present disclosure. Referring to FIG. 2 and FIG. 6, when the display panel 130 is operated in the partial panel display mode, the partial display area DZ11 of the display driving device 120 is a normal active area, and the partial display area DZ12 of the display driving device 120 is an inactive area. The control circuit 122 receives a display data frame containing low-resolution display data corresponding to the partial display area DZ11 from the interface circuit 121. The control circuit 122 drives multiple data lines of the display panel 130 based on the low-resolution display data. Therefore, the partial display area DZ11 may perform normal display operations.

Figure 7:
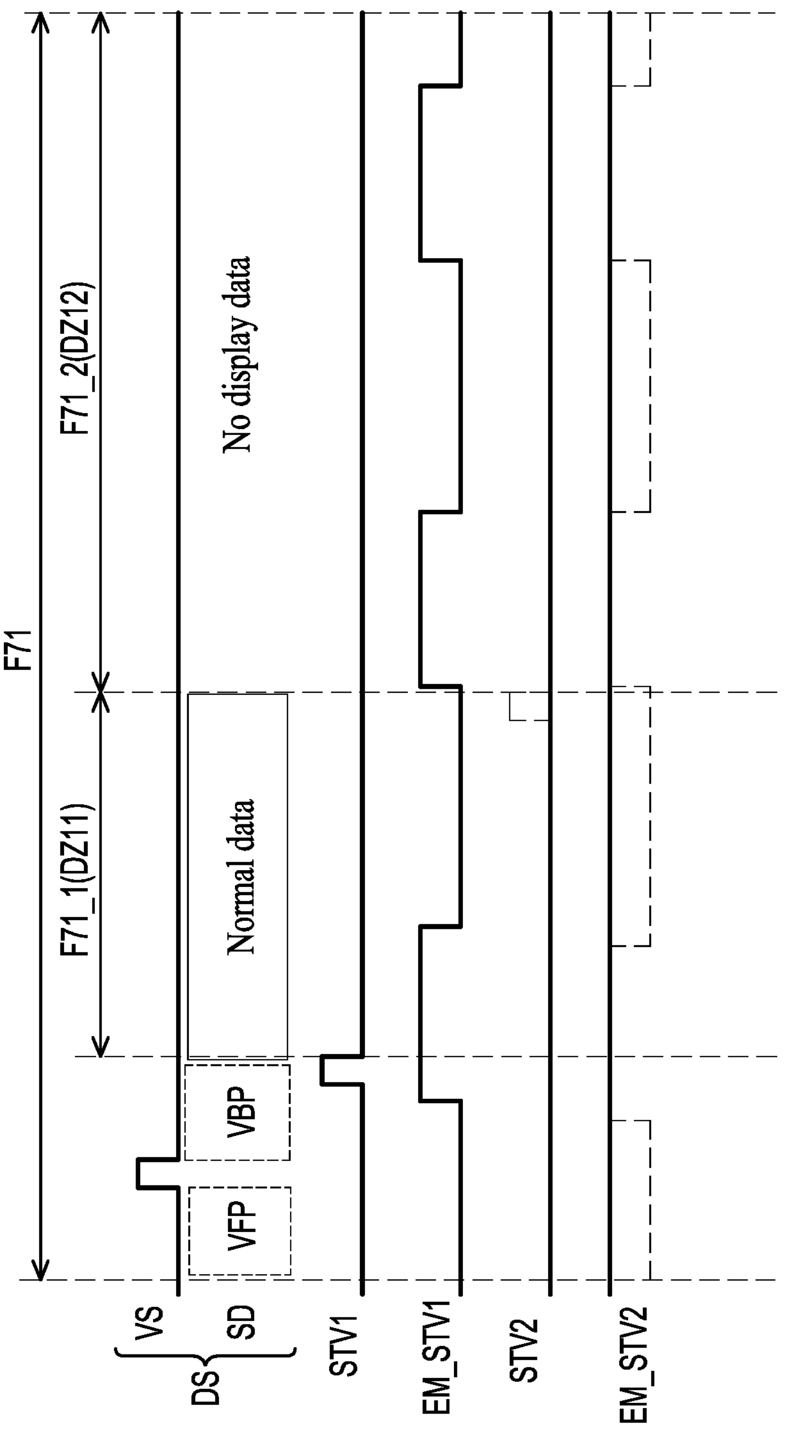
FIG. 7 is a signal timing diagram illustrating a display driving device operating in a partial panel display mode according to an embodiment of the present disclosure.

FIG. 7 is a signal timing diagram of the display driving device 120 operating in the partial panel display mode according to an embodiment of the present disclosure. The horizontal axis in FIG. 7 represents time. Referring to FIG. 1, FIG. 2, FIG. 6 and FIG. 7, the interface circuit 121 may retrieve the display data frame SD and the vertical synchronization information VS from the data stream DS provided by the processor 110 and provide them to the control circuit 122. The vertical synchronization information VS defines a frame period, such as frame period F71 shown in FIG. 7. The frame period F71 corresponding to the display data frame SD includes a porch period and a scanning period. In the partial panel display mode, the scanning period includes a sub-frame scanning period F71_1 corresponding to the partial display area DZ11 and a sub-frame scanning period F71_2 corresponding to the partial display area DZ12.

The control circuit 122 provides the gate start pulse signal STV1 shown in FIG. 7 to the gate scanning circuit GOA11 corresponding to the partial display area DZ11, so as to trigger the gate scanning circuit GOA11 to perform gate scanning on the partial display area DZ11 during the sub-frame scanning period F71_1. The control circuit 122 drives multiple data lines of the display panel 130 during the sub-frame scanning period F71_1 based on the low-resolution display data corresponding to the partial display area DZ11. The control circuit 122 provides the emission start pulse signal EM_STV1 to the emission scanning circuit GOA13 corresponding to the partial display area DZ11 to trigger the emission scanning circuit GOA13 to perform emission scanning on the partial display area DZ11 during the sub-frame scanning period F71_1. By providing the emission start pulse signal EM_STV1, the partial display area DZ11 of the display panel 130 may be in a normal display state during the entire frame period F71. Therefore, the partial display area DZ11 may perform normal display operations in the partial panel display mode shown in FIG. 6.

Since there is no display data corresponding to the partial display area DZ12 in the control circuit 122, the control circuit 122 maintains the multiple data lines of the display panel 130 in a stable state during the sub-frame scanning period F71_2. For example, the control circuit 122 may output a common voltage (or other fixed voltage) to multiple data lines of the display panel 130 during the sub-frame scanning period F71_2. The control circuit 122 cancels the gate start pulse signal STV2 provided to the gate scanning circuit GOA12 to disable the gate scanning on the partial display area DZ12 performed by the gate scanning circuit GOA12 during the sub-frame scanning period F71_2. The control circuit 122 also cancels the emission start pulse signal EM_STV2 to the emission scanning circuit GOA14 to disable the emission scanning on the partial display area DZ12 performed by the emission scanning circuit GOA14 during the sub-frame scanning period F71_2. By canceling the emission start pulse signal EM_STV2, the partial display area DZ12 of the display panel 130 operates in a non-display state during the entire frame period F71. Therefore, the partial display area DZ12 has no display operation in the partial panel display mode shown in FIG. 6.

Figure 8:
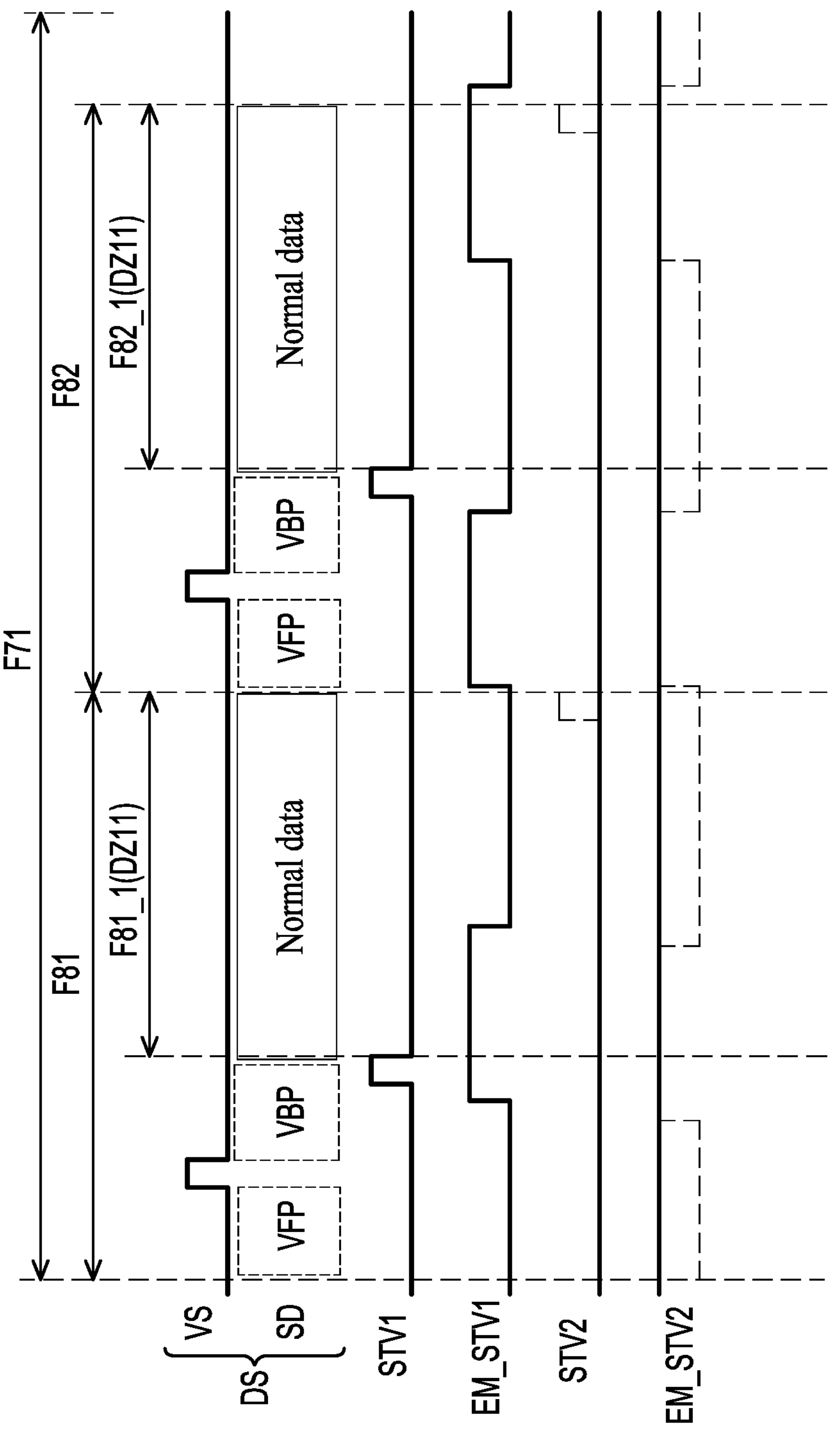
FIG. 8 is a signal timing diagram illustrating a display driving device operating in a partial panel display mode according to another embodiment of the present disclosure.

FIG. 8 is a signal timing diagram of the display driving device 120 operating in the partial panel display mode according to another embodiment of the present disclosure. The horizontal axis in FIG. 8 represents time. Referring to FIG. 1, FIG. 2, FIG. 6 and FIG. 8, the interface circuit 121 may retrieve the display data frame SD and the vertical synchronization information VS from the data stream DS provided by the processor 110 and provide them to the control circuit 122. The vertical synchronization information VS defines a frame period, such as a frame period F81 and a frame period F82 shown in FIG. 8. The frame period F81 includes a porch period and a scanning period (sub-frame scanning period F81_1 corresponding to the partial display area DZ11). The frame period F82 includes a porch period and a scanning period (sub-frame scanning period F82_1 corresponding to the partial display area DZ11).

For comparison, the frame period F71 shown in FIG. 7 is also shown in FIG. 8. Compared with the frame period F71, the frame period F81 shown in FIG. 8 does not include the sub-frame scanning period F71_2 corresponding to the partial display area DZ12. For the frame period F82 shown in FIG. 8, reference may be made to the relevant description of the frame period F81 by analogy.

The control circuit 122 provides the gate start pulse signal STV1 shown in FIG. 8 to the gate scanning circuit GOA11 corresponding to the partial display area DZ11, so as to trigger the gate scanning circuit GOA11 to perform gate scanning on the partial display area DZ11 during the sub-frame scanning period F81_1. The control circuit 122 drives multiple data lines of the display panel 130 during the sub-frame scanning period F81_1 based on the low-resolution display data corresponding to the partial display area DZ11. The control circuit 122 provides the emission start pulse signal EM_STV1 to the emission scanning circuit GOA13 corresponding to the partial display area DZ11 to trigger the emission scanning circuit GOA13 to perform emission scanning on the partial display area DZ11 during the sub-frame scanning period F81_1. By providing the emission start pulse signal EM_STV1, the partial display area DZ11 of the display panel 130 operates in a normal display state during the entire frame period F81. Therefore, the partial display area DZ11 may perform normal display operations in the partial panel display mode shown in FIG. 6.

The control circuit 122 cancels the gate start pulse signal STV2 provided to the gate scanning circuit GOA12 to disable the gate scanning on the partial display area DZ12 performed by the gate scanning circuit GOA12. The control circuit 122 also cancels the emission start pulse signal EM_STV2 to the emission scanning circuit GOA14 to disable the emission scanning on the partial display area DZ12 performed by the emission scanning circuit GOA14. By canceling the emission start pulse signal EM_STV2, the partial display area DZ12 of the display panel 130 operates in a non-display state during the entire frame period F81. Therefore, the partial display area DZ12 has no display operation in the partial panel display mode shown in FIG. 6.

Figure 9:
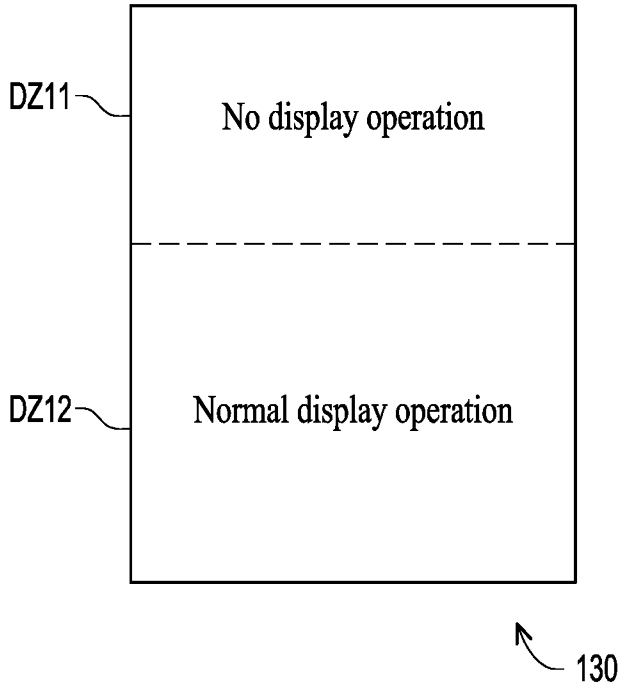
FIG. 9 is a schematic diagram illustrating a display panel operating in another partial panel display mode according to an embodiment of the present disclosure.

FIG. 9 is a schematic diagram illustrating a scenario where the display panel 130 is operated in another partial panel display mode (for example, the second partial panel display mode) according to an embodiment of the present disclosure. Referring to FIG. 2 and FIG. 9, when the display panel 130 is operated in the partial panel display mode, the partial display area DZ12 of the display driving device 120 is a normal active area, and the partial display area DZ11 of the display driving device 120 is an inactive area. The control circuit 122 receives a display data frame containing low-resolution display data (e.g., third resolution display data) corresponding to the partial display area DZ12 from the interface circuit 121. The control circuit 122 drives multiple data lines of the display panel 130 based on the low-resolution display data. Therefore, the partial display area DZ12 may perform normal display operations.

Figure 10:
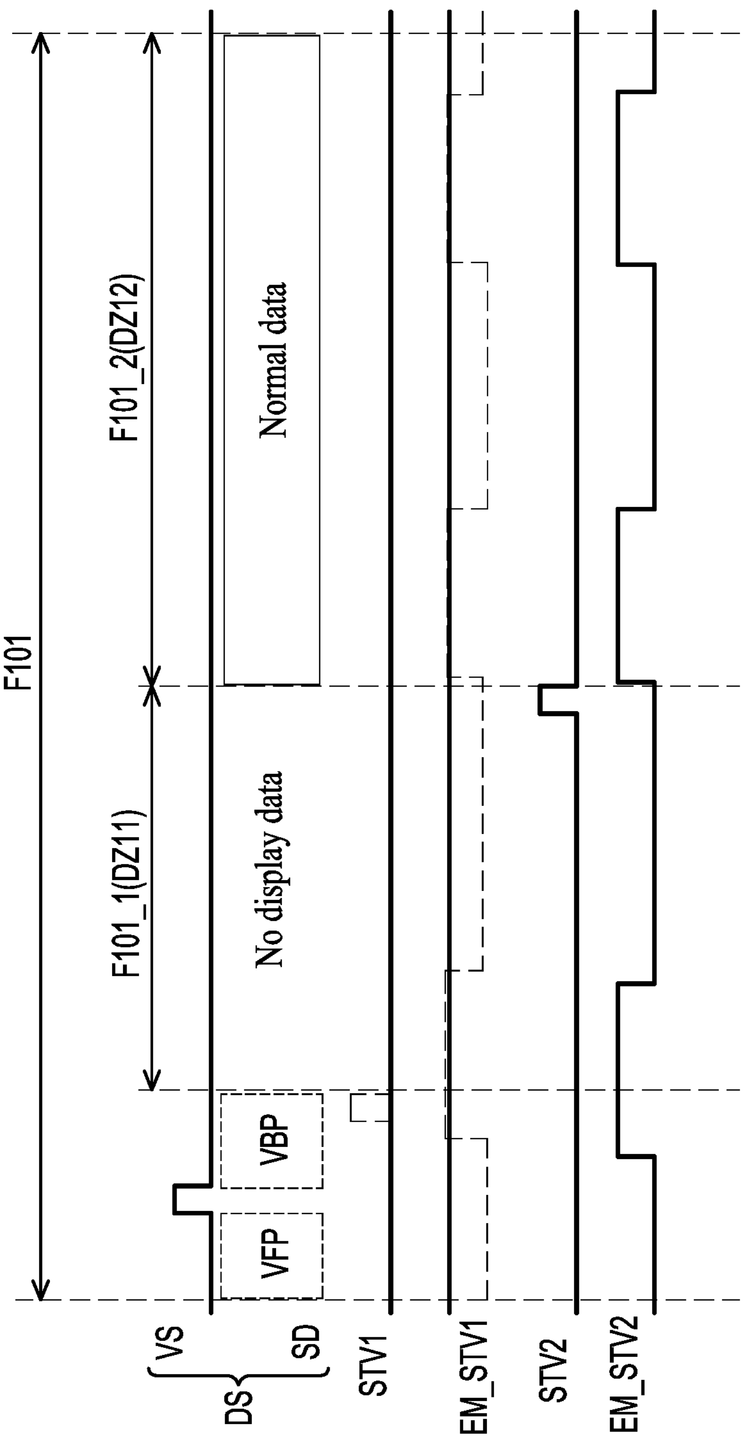
FIG. 10 is a signal timing diagram illustrating a display driving device operating in another partial panel display mode according to an embodiment of the present disclosure.

FIG. 10 is a signal timing diagram of the display driving device 120 operating in the partial panel display mode according to another embodiment of the present disclosure. The horizontal axis in FIG. 10 represents time. Referring to FIG. 1, FIG. 2, FIG. 9 and FIG. 10, the interface circuit 121 may retrieve the display data frame SD and the vertical synchronization information VS from the data stream DS provided by the processor 110 and provide them to the control circuit 122. The vertical synchronization information VS defines a frame period, such as frame period F101 shown in FIG. 10. The frame period F101 corresponding to the display data frame SD includes a porch period and a scanning period. In the partial panel display mode, the scanning period includes a sub-frame scanning period F101_1 corresponding to the partial display area DZ11 and a sub-frame scanning period F101_2 corresponding to the partial display area DZ12.

Since there is no display data corresponding to the partial display area DZ11 in the control circuit 122, the control circuit 122 maintains the multiple data lines of the display panel 130 in a stable state during the sub-frame scanning period F101_1. For example, the control circuit 122 may output a common voltage (or other fixed voltage) to multiple data lines of the display panel 130 during the sub-frame scanning period F101_1. The control circuit 122 cancels the gate start pulse signal STV1 provided to the gate scanning circuit GOA11 to disable gate scanning on the partial display area DZ11 performed by the gate scanning circuit GOA11 during the sub-frame scanning period F101_1. The control circuit 122 also cancels the emission start pulse signal EM_STV1 provided to the emission scanning circuit GOA13 to disable the emission scanning on the partial display area DZ11 performed by the emission scanning circuit GOA13 during the sub-frame scanning period F101_1. By canceling the emission start pulse signal EM_STV1, the partial display area DZ11 of the display panel 130 operates in a non-display state during the entire frame period F101. Therefore, the partial display area DZ11 has no display operation in the partial panel display mode shown in FIG. 9.

The control circuit 122 provides the gate start pulse signal STV2 shown in FIG. 10 to the gate scanning circuit GOA12 corresponding to the partial display area DZ12, so as to trigger the gate scanning circuit GOA12 to perform gate scanning on the partial display area DZ12 during the sub-frame scanning period F101_2. The control circuit 122 drives multiple data lines of the display panel 130 during the sub-frame scanning period F101_2 based on the low-resolution display data corresponding to the partial display area DZ12. The control circuit 122 provides the emission start pulse signal EM_STV2 to the emission scanning circuit GOA14 corresponding to the partial display area DZ12 to trigger the emission scanning circuit GOA14 to perform emission scanning on the partial display area DZ12 during the sub-frame scanning period F101_2. By providing the emission start pulse signal EM_STV2, the partial display area DZ12 of the display panel 130 may be in a normal display state during the entire frame period F101. Therefore, the partial display area DZ12 may perform normal display operations in the partial panel display mode shown in FIG. 9.

Figure 11:
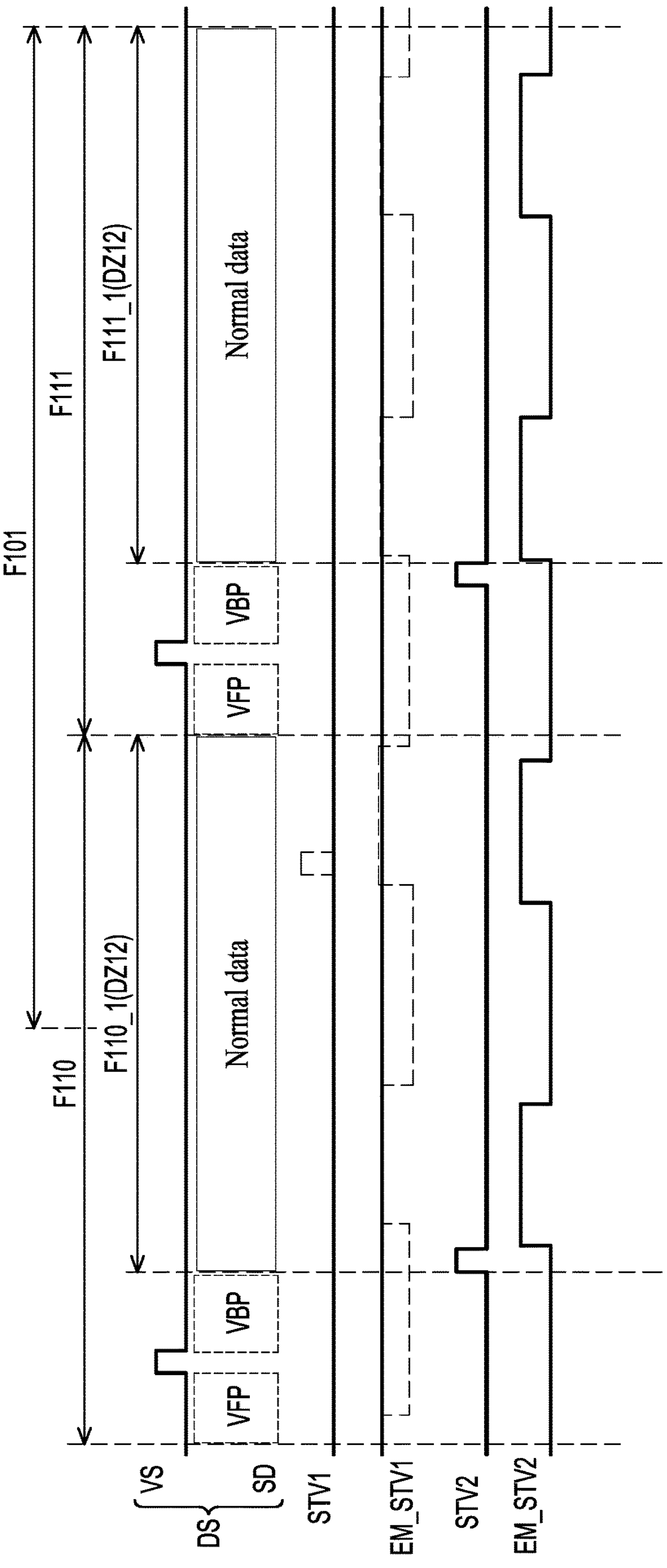
FIG. 11 is a signal timing diagram illustrating a display driving device operating in another partial panel display mode according to still another embodiment of the present disclosure.

FIG. 11 is a signal timing diagram of the display driving device 120 operating in the partial panel display mode according to yet another embodiment of the present disclosure. The horizontal axis in FIG. 11 represents time. Referring to FIG. 1, FIG. 2, FIG. 9 and FIG. 11, the interface circuit 121 may retrieve the display data frame SD and the vertical synchronization information VS from the data stream DS provided by the processor 110 and provide them to the control circuit 122. The vertical synchronization information VS defines a frame period, such as the frame period F110 and the frame period F111 shown in FIG. 11. The frame period F110 includes a porch period and a scanning period (sub-frame scanning period F110_1 corresponding to the partial display area DZ12). The frame period F111 includes a porch period and a scanning period (sub-frame scanning period F111_1 corresponding to the partial display area DZ12).

For comparison, the frame period F101 shown in FIG. 10 is also shown in FIG. 11. Compared with the frame period F101, the frame period F111 shown in FIG. 11 does not have the sub-frame scanning period F101_1 corresponding to the partial display area DZ11. For the frame period F110 shown in FIG. 11, reference may be made to the relevant description of the frame period F111 by analogy.

The control circuit 122 cancels the gate start pulse signal STV1 provided to the gate scanning circuit GOA11 to disable the gate scanning on the partial display area DZ11 performed by the gate scanning circuit GOA11. The control circuit 122 also cancels the emission start pulse signal EM_STV1 provided to the emission scanning circuit GOA13 to disable the emission scanning on the partial display area DZ11 performed by the emission scanning circuit GOA13. By canceling the emission start pulse signal EM_STV1, the partial display area DZ11 of the display panel 130 operates in a non-display state during the entire frame period F111. Therefore, the partial display area DZ11 has no display operation in the partial panel display mode shown in FIG. 9.

The control circuit 122 provides the gate start pulse signal STV2 shown in FIG. 11 to the gate scanning circuit GOA12 corresponding to the partial display area DZ12, so as to trigger the gate scanning circuit GOA12 to perform gate scanning on the partial display area DZ12 during the sub-frame scanning period F111_1. The control circuit 122 drives multiple data lines of the display panel 130 during the sub-frame scanning period F111_1 based on the low-resolution display data corresponding to the partial display area DZ12. The control circuit 122 provides the emission start pulse signal EM_STV2 to the emission scanning circuit GOA14 corresponding to the partial display area DZ12 to trigger the emission scanning circuit GOA14 to perform emission scanning on the partial display area DZ12 during the sub-frame scanning period F111_1. By providing the emission start pulse signal EM_STV2, the partial display area DZ12 of the display panel 130 operates in a normal display state throughout the frame period F111. Therefore, the partial display area DZ12 may perform a normal display operation in the partial panel display mode shown in FIG. 9.

In the embodiment shown in FIG. 2, the control circuit 122 includes a processing circuit IP2, a timing circuit TM2, a gate signal control circuit GC2, an emission signal control circuit EC2, and a source signal control circuit SC2. The number of processing circuits IP2 may be one or more. The processing circuit IP2 is coupled to the interface circuit 121 to receive the display data frame. The processing circuit IP2 may perform at least one image processing on the display data frame to generate a processed data frame. Based on the actual design, in some embodiments, the image processing performed by the processing circuit IP2 on the display data frame may include logical operations, image enhancement or other processing, such as: De-mura, Deburn-in, color enhancement and other image processing.

The timing circuit TM2 is coupled to the processing circuit IP2 to receive the processed data frame. The timing circuit TM2 controls the operation timing of the control circuit 122 based on the vertical synchronization information VS (not shown in FIG. 2). The gate signal control circuit GC2 and the emission signal control circuit EC2 are coupled to the timing circuit TM2. The timing circuit TM2 may control the operation timing of the gate signal control circuit GC2 and the emission signal control circuit EC2. The source signal control circuit SC2 is also coupled to the timing circuit TM2 to receive the processed data frame. Based on the timing control of the timing circuit TM2, the source signal control circuit SC2 may drive the data lines of the display panel 130 in accordance with the scanning timing of the scanning circuit.

In the full panel display mode, the processed data frame received by the source signal control circuit SC2 from the timing circuit TM2 contains the first resolution display data (high-resolution display data corresponding to the entire display area of the display panel 130). The source signal control circuit SC2 drives the data lines of the display panel 130 based on the first resolution display data. Based on the timing control of the timing circuit TM2, the gate signal control circuit GC2 provides the gate start pulse signal STV1 to the gate scanning circuit GOA11 corresponding to the partial display area DZ11 to trigger the gate scanning circuit GOA11 to perform gate scanning on the partial display area DZ11 during the first sub-frame scanning period. The gate signal control circuit GC2 provides the gate start pulse signal STV2 to the gate scanning circuit GOA12 corresponding to the partial display area DZ12 to trigger the gate scanning circuit GOA12 to perform gate scanning on the partial display area DZ12 during the second sub-frame scanning period. In addition, based on the timing control of the timing circuit TM2, the emission signal control circuit EC2 provides the emission start pulse signal EM_STV1 to the emission scanning circuit GOA13 corresponding to the partial display area DZ11 to trigger the emission scanning circuit GOA13 to perform emission scanning on the partial display area DZ11 during the first sub-frame scanning period. The emission signal control circuit EC2 provides the emission start pulse signal EM_STV2 to the emission scanning circuit GOA14 corresponding to the partial display area DZ12 to trigger the emission scanning circuit GOA14 to perform emission scanning on the partial display area DZ12 during the second sub-frame scanning period. Description of the operation of the control circuit 122 in the full panel display mode may be derived from the relevant descriptions of FIG. 3, FIG. 4 and FIG. 5, and therefore related details will not be described again.

Please refer to FIG. 1, FIG. 2, FIG. 6 and FIG. 7. In the first partial panel display mode, the processed data frame received by the source signal control circuit SC2 from the timing circuit TM2 contains the second resolution display data corresponding to the partial display area DZ11 (but not contain the display data corresponding to other display areas except the partial display area DZ11), and the source signal control circuit SC2 drives the data lines of the display panel 130 based on the second resolution display data. The gate signal control circuit GC2 provides the gate start pulse signal STV1 to the gate scanning circuit GOA11 based on the timing control of the timing circuit TM2 to trigger the gate scanning circuit GOA11 to perform gate scanning on the partial display area DZ11 during the sub-frame scanning period F71_1. The source signal control circuit SC2 drives the data lines of the display panel 130 during the sub-frame scanning period F71_1 based on the second resolution display data. The gate signal control circuit GC2 cancels the gate start pulse signal STV2 to disable the gate scanning on the partial display area DZ12 performed by the scanning circuit GOA12 during the sub-frame scanning period F71_2. Since there is no display data corresponding to the partial display area DZ12 in the source signal control circuit SC2, the source signal control circuit SC2 maintains the data lines of the display panel 130 at a steady state (fixed voltage) during the sub-frame scanning period F71_2. Based on the timing control of the timing circuit TM2, the emission signal control circuit EC2 provides the first emission start pulse signal EM_STV1 to the emission scanning circuit GOA13 to trigger the emission scanning circuit GOA13 to perform emission scanning on the partial display area DZ11 during the sub-frame scanning period F71_1. The emission signal control circuit EC2 cancels the emission start pulse signal EM_STV2 to disable the emission scanning on the partial display area DZ12 performed by the emission scanning circuit GOA14 during the sub-frame scanning period F71_2.

Please refer to FIG. 1, FIG. 2, FIG. 6 and FIG. 8. In the first partial panel display mode, the gate signal control circuit GC2 provides the gate start pulse signal STV1 to the gate scanning circuit GOA11 corresponding to the partial display area DZ11 based on the timing control of the timing circuit TM2 to trigger the gate scanning circuit GOA11 to perform gate scanning on the partial display area DZ11 during the sub-frame scanning period F81_1. The source signal control circuit drives the data lines of the display panel 130 during the sub-frame scanning period F81_1 based on the second resolution display data corresponding to the partial display area DZ11. The gate signal control circuit GC2 cancels the gate start pulse signal STV2 provided to the gate scanning circuit GOA12 to disable the gate scanning on the partial display area DZ12 performed by the gate scanning circuit GOA12. Based on the timing control of the timing circuit TM2, the emission signal control circuit EC2 provides a first emission start pulse signal EM_STV1 to the emission scanning circuit GOA13 corresponding to the first partial display area DZ11 to trigger the emission scanning circuit GOA13 to perform emission scanning on the partial display area DZ11 during the sub-frame scanning period F81_1. The emission signal control circuit EC2 cancels the emission start pulse signal EM_STV2 provided to the emission scanning circuit GOA14 to disable the emission scanning on the partial display area DZ12 performed by the emission scanning circuit GOA14.

In summary, the control circuit 122 may be selectively operated in either the full panel display mode or the partial panel display mode. When the display panel 130 is operated in the first partial panel display mode, the display data frame does not contain display data corresponding to other display areas (inactive areas) except the normal active area. Therefore, the amount of data transmitted in the transmitting channel may be effectively reduced. Furthermore, because the display data frame does not include display data in the inactive area, the processing circuit IP2 does not need to perform various image processing on the display data in the inactive area, thereby avoiding consumption/waste of computing resources and power consumption.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A display driving device disposed to drive a display panel, and the display driving device comprising:

an interface circuit receiving a data stream from a processor, wherein the data stream comprises a display data frame and vertical synchronization information; and a control circuit coupled to the interface circuit to receive the vertical synchronization information and the display data frame, wherein in response to the display panel operating in a full panel display mode, the display data frame received by the control circuit from the interface circuit contains a first resolution display data corresponding to an entire display area of the display panel, and the control circuit drives a plurality of data lines of the display panel based on the first resolution display data; and in response to the display panel operating in a first partial panel display mode, the display data frame received by the control circuit from the interface circuit contains a second resolution display data corresponding to a first partial display area of the display panel, but does not contain a display data corresponding to other display areas in the display panel except the first partial display area, thereby reducing a data size of the data stream transmitted from the processor to the interface circuit compared to the full panel display mode, and the control circuit drives the plurality of data lines based on the second resolution display data, wherein a resolution of the second resolution display data is lower than a resolution of the first resolution display data.

2. The display driving device according to claim 1, wherein in response to the display panel operating in a second partial panel display mode, the display data frame received by the control circuit from the interface circuit contains a third resolution display data corresponding to a second partial display area of the display panel, but does not contain a display data corresponding to other display areas in the display panel except the second partial display area, and the control circuit drives the plurality of data lines based on the third resolution display data, wherein a resolution of the third resolution display data is lower than the resolution of the first resolution display data, and the second partial display area is different from the first partial display area.

3. The display driving device according to claim 1, wherein in the full panel display mode:

the vertical synchronization information defines a frame period, the frame period corresponding to the display data frame comprises a porch period, a first sub-frame scanning period corresponding to the first partial display area, and a second sub-frame scanning period corresponding to a second partial display area of the display panel, wherein the second partial display area is different from the first partial display area;

the control circuit provides a first gate start pulse signal to a first gate scanning circuit corresponding to the first partial display area to trigger the first gate scanning circuit to perform gate scanning on the first partial display area of the display panel during the first sub-frame scanning period; and the control circuit provides a second gate start pulse signal to a second gate scanning circuit corresponding to the second partial display area to trigger the second gate scanning circuit to perform gate scanning on the second partial display area of the display panel during the second sub-frame scanning period.

4. The display driving device according to claim 3, wherein in the full panel display mode:

the control circuit provides a first emission start pulse signal to a first emission scanning circuit corresponding to the first partial display area to trigger the first emission scanning circuit to perform emission scanning on the first partial display area of the display panel during the first sub-frame scanning period; and the control circuit provides a second emission start pulse signal to a second emission scanning circuit corresponding to the second partial display area to trigger the second emission scanning circuit to perform emission scanning on the second partial display area of the display panel during the second sub-frame scanning period.

5. The display driving device according to claim 1, wherein in the first partial panel display mode:

the vertical synchronization information defines a frame period, the frame period corresponding to the display data frame comprises a first sub-frame scanning period corresponding to the first partial display area, and a second sub-frame scanning period corresponding to a second partial display area of the display panel, wherein the second partial display area is different from the first partial display area;

the control circuit provides a first gate start pulse signal to a first gate scanning circuit corresponding to the first partial display area to trigger the first gate scanning circuit to perform gate scanning on the first partial display area of the display panel during the first sub-frame scanning period;

the control circuit drives the plurality of data lines during the first sub-frame scanning period based on the second resolution display data;

the control circuit maintains the plurality of data lines in a stable state during the second sub-frame scanning period because there is no display data corresponding to the second partial display area; and the control circuit cancels a second gate start pulse signal provided to a second gate scanning circuit to disable gate scanning on the second partial display area performed by the second gate scanning circuit during the second sub-frame scanning period.

6. The display driving device according to claim 5, wherein in the first partial panel display mode:

the control circuit provides a first emission start pulse signal to a first emission scanning circuit corresponding to the first partial display area to trigger the first emission scanning circuit to perform emission scanning on the first partial display area of the display panel during the first sub-frame scanning period; and the control circuit cancels a second emission start pulse signal provided to a second emission scanning circuit to disable emission scanning on the second partial display area performed by the second emission scanning circuit during the second sub-frame scanning period.

7. The display driving device according to claim 6, wherein in the first partial panel display mode:

by providing the first emission start pulse signal, the first partial display area of the display panel operates in a normal display state during the entire frame period; and by canceling the second emission start pulse signal, the second partial display area of the display panel operates in a non-display state during the entire frame period.

8. The display driving device according to claim 1, wherein in the first partial panel display mode:

the vertical synchronization information defines a frame period, the frame period corresponding to the display data frame comprises a porch period and a first sub-frame scanning period corresponding to the first partial display area, wherein there is no scanning period corresponding to a second partial display area of the display panel during the frame period, and the first partial display area is different from the second partial display area;

the control circuit provides a first gate start pulse signal to a first gate scanning circuit corresponding to the first partial display area to trigger the first gate scanning circuit to perform gate scanning on the first partial display area of the display panel during the first sub-frame scanning period;

the control circuit drives the plurality of data lines during the first sub-frame scanning period based on the second resolution display data; and the control circuit cancels a second gate start pulse signal provided to a second gate scanning circuit to disable gate scanning on the second partial display area performed by the second gate scanning circuit.

9. The display driving device according to claim 8, wherein in the first partial panel display mode:

the control circuit provides a first emission start pulse signal to a first emission scanning circuit corresponding to the first partial display area to trigger the first emission scanning circuit to perform emission scanning on the first partial display area of the display panel during the first sub-frame scanning period; and the control circuit cancels a second emission start pulse signal provided to a second emission scanning circuit to disable emission scanning on the second partial display area performed by the second emission scanning circuit.

10. The display driving device according to claim 9, wherein in the first partial panel display mode:

by providing the first emission start pulse signal, the first partial display area of the display panel operates in a normal display state during the entire frame period; and by canceling the second emission start pulse signal, the second partial display area of the display panel operates in a non-display state during the entire frame period.

11. The display driving device according to claim 1, wherein the control circuit comprises:

at least one processing circuit coupled to the interface circuit to receive the display data frame, wherein the at least one processing circuit performs at least one image processing on the display data frame to generate a processed data frame;

a timing circuit coupled to the at least one processing circuit to receive the processed data frame, wherein the timing circuit controls an operation timing of the control circuit based on the vertical synchronization information; and a source signal control circuit coupled to the timing circuit to receive the processed data frame, wherein in the full panel display mode, the processed data frame received by the source signal control circuit from the timing circuit contains the first resolution display data, and the source signal control circuit drives the plurality of data lines based on the first resolution display data; and in the first partial panel display mode, the processed data frame received by the source signal control circuit from the timing circuit contains the second resolution display data but does not contain a display data corresponding to other display areas except the first partial display area, and the source signal control circuit drives the plurality of data lines based on the second resolution display data.

12. The display driving device according to claim 11, wherein the vertical synchronization information defines a frame period, the frame period corresponding to the display data frame comprises a porch period, a first sub-frame scanning period corresponding to the first partial display area, and a second sub-frame scanning period corresponding to a second partial display area of the display panel, the control circuit further comprises:

a gate signal control circuit coupled to the timing circuit, wherein in the full panel display mode, the gate signal control circuit provides a first gate start pulse signal to a first gate scanning circuit corresponding to the first partial display area based on a timing control of the timing circuit to trigger the first gate scanning circuit to perform gate scanning on the first partial display area during the first sub-frame scanning period, and provides a second gate start pulse signal to a second gate scanning circuit corresponding to the second partial display area to trigger the second gate scanning circuit to perform gate scanning on the second partial display area during the second sub-frame scanning period; and in the first partial panel display mode, the gate signal control circuit provides the first gate start pulse signal to the first gate scanning circuit based on the timing control of the timing circuit to trigger the first gate scanning circuit to perform gate scanning on the first partial display area during the first sub-frame scanning period, the source signal control circuit drives the plurality of data lines based on the second resolution display data during the first sub-frame scanning period, and the gate signal control circuit cancels the second gate start pulse signal to disable gate scanning on the second partial display area performed by the second gate scanning circuit during the second sub-frame scanning period, and the source signal control circuit maintains the plurality of data lines in a stable state during the second sub-frame scanning period because there is no display data corresponding to the second partial display area.

13. The display driving device according to claim 12, wherein the control circuit further comprises:

an emission signal control circuit coupled to the timing circuit, wherein, in the full panel display mode, the emission signal control circuit provides a first emission start pulse signal to a first emission scanning circuit corresponding to the first partial display area based on the timing control of the timing circuit to trigger the first emission scanning circuit to perform emission scanning on the first partial display area during the first sub-frame scanning period, and provides a second emission start pulse signal to a second emission scanning circuit corresponding to the second partial display area to trigger the second emission scanning circuit to perform emission scanning on the second partial display area during the second sub-frame scanning period; and in the first partial panel display mode, the emission signal control circuit provides the first emission start pulse signal to the first emission scanning circuit based on the timing control of the timing circuit to trigger the first emission scanning circuit to perform emission scanning on the first partial display area during the first sub-frame scanning period, and cancels the second emission start pulse signal to disable emission scanning on the second partial display area performed by the second emission scanning circuit during the second sub-frame scanning period.

14. The display driving device according to claim 11, wherein the vertical synchronization information defines a frame period, and the control circuit further comprises:

a gate signal control circuit coupled to the timing circuit, wherein in the first partial panel display mode, the frame period corresponding to the display data frame comprises a porch period and a first sub-frame scanning period corresponding to the first partial display area but there is no scanning period corresponding to a second partial display area of the display panel, the gate signal control circuit provides a first gate start pulse signal to a first gate scanning circuit corresponding to the first partial display area based on a timing control of the timing circuit to trigger the first gate scanning circuit to perform gate scanning on the first partial display area during the first sub-frame scanning period, the source signal control circuit drives the plurality of data lines based on the second resolution display data during the first sub-frame scanning period, and the gate signal control circuit cancels a second gate start pulse signal provided to a second gate scanning circuit to disable gate scanning on the second partial display area performed by the second gate scanning circuit.

15. The display driving device according to claim 14, wherein the control circuit further comprises:

an emission signal control circuit coupled to the timing circuit, wherein in the first partial panel display mode, the emission signal control circuit provides a first emission start pulse signal to a first emission scanning circuit corresponding to the first partial display area based on the timing control of the timing circuit to trigger the first emission scanning circuit to perform emission scanning on the first partial display area during the first sub-frame scanning period, and cancels a second emission start pulse signal provided to a second emission scanning circuit to disable emission scanning on the second partial display area performed by the second emission scanning circuit.

16. A driving method of a display driving device, comprising:

receiving a data stream from a processor by an interface circuit of the display driving device, wherein the data stream comprises a display data frame and vertical synchronization information;

in response to a display panel operating in a full panel display mode, receiving the display data frame containing a first resolution display data corresponding to an entire display area of the display panel from the interface circuit by a control circuit of the display driving device, and driving a plurality of data lines of the display panel based on the first resolution display data by the control circuit; and in response to the display panel operating in a first partial panel display mode, receiving the display data frame containing a second resolution display data corresponding to a first partial display area of the display panel from the interface circuit by the control circuit, but the display data frame does not comprise the display data corresponding to other display areas in the display panel except the first partial display area, thereby reducing a data size of the data stream transmitted from the processor to the interface circuit compared to the full panel display mode, and driving the plurality of data lines based on the second resolution display data by the control circuit, wherein a resolution of the second resolution display data is lower than a resolution of the first resolution display data.

17. The driving method according to claim 16, further comprising:

in response to the display panel operating in a second partial panel display mode, receiving the display data frame containing a third resolution display data corresponding to a second partial display area of the display panel from the interface circuit by the control circuit, but the display data frame does not comprise the display data corresponding to other display areas in the display panel except the second partial display area, and driving the plurality of data lines based on the third resolution display data by the control circuit, wherein a resolution of the third resolution display data is lower than the resolution of the first resolution display data, and the second partial display area is different from the first partial display area.

18. The driving method according to claim 16, wherein in the full panel display mode, the vertical synchronization information defines a frame period, the frame period corresponding to the display data frame comprises a porch period, a first sub-frame scanning period corresponding to the first partial display area, a second sub-frame scanning period corresponding to a second partial display area of the display panel, the second partial display area is different from the first partial display area, and the driving method further comprises:

in the full panel display mode, providing a first gate start pulse signal to a first gate scanning circuit corresponding to the first partial display area by the control circuit, so as to trigger the first gate scanning circuit to perform gate scanning on the first partial display area of the display panel during the first sub-frame scanning period; and in the full panel display mode, providing a second gate start pulse signal to a second gate scanning circuit corresponding to the second partial display area by the control circuit, so as to trigger the second gate scanning circuit to perform gate scanning on the second partial display area of the display panel during the second sub-frame scanning period.

19. The driving method according to claim 18, further comprising:

in the full panel display mode, providing a first emission start pulse signal to a first emission scanning circuit corresponding to the first partial display area by the control circuit, so as to trigger the first emission scanning circuit to perform emission scanning on the first partial display area of the display panel during the first sub-frame scanning period; and in the full panel display mode, providing a second emission start pulse signal to a second emission scanning circuit corresponding to the second partial display area by the control circuit, so as to trigger the second emission scanning circuit to perform emission scanning on the second partial display area of the display panel during the second sub-frame scanning period.

20. The driving method according to claim 16, wherein in the first partial panel display mode, the vertical synchronization information defines a frame period, the frame period corresponding to the display data frame comprises a first sub-frame scanning period corresponding to the first partial display area, and a second sub-frame scanning period corresponding to a second partial display area of the display panel, the second partial display area is different from the first partial display area, and the driving method further comprises:

in the first partial panel display mode, providing a first gate start pulse signal to a first gate scanning circuit corresponding to the first partial display area by the control circuit, so as to trigger the first gate scanning circuit to perform gate scanning on the first partial display area of the display panel during the first sub-frame scanning period;

driving the plurality of data lines by the control circuit during the first sub-frame scanning period based on the second resolution display data;

in the first partial panel display mode, maintaining the plurality of data lines in a stable state by the control circuit during the second sub-frame scanning period because there is no display data corresponding to the second partial display area; and in the first partial panel display mode, canceling a second gate start pulse signal provided to a second gate scanning circuit by the control circuit, so as to disable gate scanning on the second partial display area performed by the second gate scanning circuit during the second sub-frame scanning period.

21. The driving method according to claim 20, further comprising:

in the first partial panel display mode, providing a first emission start pulse signal to a first emission scanning circuit corresponding to the first partial display area by the control circuit, so as to trigger the first emission scanning circuit to perform emission scanning on the first partial display area of the display panel during the first sub-frame scanning period; and in the first partial panel display mode, canceling a second emission start pulse signal provided to a second emission scanning circuit by the control circuit, so as to disable emission scanning on the second partial display area performed by the second emission scanning circuit during the second sub-frame scanning period.

22. The driving method according to claim 21, further comprising:

in the first partial panel display mode, by providing the first emission start pulse signal, operating the first partial display area of the display panel in a normal display state during the entire frame period; and in the first partial panel display mode, by canceling the second emission start pulse signal, operating the second partial display area of the display panel in a non-display state during the entire frame period.

23. The driving method according to claim 16, wherein in the first partial panel display mode, the vertical synchronization information defines a frame period, the frame period corresponding to the display data frame comprises a porch period and a first sub-frame scanning period corresponding to the first partial display area, there is no scanning period corresponding to a second partial display area of the display panel during the frame period, the first partial display area is different from the second partial display area, and the driving method further comprises:

in the first partial panel display mode, providing a first gate start pulse signal to a first gate scanning circuit corresponding to the first partial display area by the control circuit, so as to trigger the first gate scanning circuit to perform gate scanning on the first partial display area of the display panel during the first sub-frame scanning period;

driving the plurality of data lines by the control circuit during the first sub-frame scanning period based on the second resolution display data; and in the first partial panel display mode, canceling a second gate start pulse signal provided to a second gate scanning circuit by the control circuit, so as to disable gate scanning on the second partial display area performed by the second gate scanning circuit.

24. The driving method according to claim 23, further comprising:

in the first partial panel display mode, providing a first emission start pulse signal to a first emission scanning circuit corresponding to the first partial display area by the control circuit, so as to trigger the first emission scanning circuit to perform emission scanning on the first partial display area of the display panel during the first sub-frame scanning period; and in the first partial panel display mode, canceling a second emission start pulse signal provided to a second emission scanning circuit by the control circuit, so as to disable emission scanning on the second partial display area performed by the second emission scanning circuit.

25. The driving method according to claim 24, further comprising:

in the first partial panel display mode, by providing the first emission start pulse signal, operating the first partial display area of the display panel in a normal display state during the entire frame period; and in the first partial panel display mode, by canceling the second emission start pulse signal, operating the second partial display area of the display panel in a non-display state during the entire frame period.

26. A display apparatus comprising:

a processor;

a display panel; and a display driving device disposed to drive the display panel, wherein the display driving device is coupled to the processor to receive a data stream, the data stream comprises a display data frame and vertical synchronization information, in response to the display panel operating in a full panel display mode, the display data frame received by the display driving device from the processor contains a first resolution display data corresponding to an entire display area of the display panel, and the display driving device drives a plurality of data lines of the display panel based on the first resolution display data; and in response to the display panel operating in a first partial panel display mode, the display data frame received by the display driving device from the processor contains a second resolution display data corresponding to a first partial display area of the display panel, but does not contain a display data corresponding to other display areas in the display panel except the first partial display area, thereby reducing a data size of the data stream transmitted from the processor to the display driving device compared to the full panel display mode, and the display driving device drives the plurality of data lines based on the second resolution display data, wherein a resolution of the second resolution display data is lower than a resolution of the first resolution display data.

27. The display apparatus according to claim 26, wherein the display driving device comprises:

a control circuit; and an interface circuit receiving the data stream from the processor, wherein the interface circuit is coupled to the control circuit to provide the display data frame and the vertical synchronization information of the data stream to the control circuit, in response to the display panel operating in the full panel display mode, the display data frame received by the control circuit from the interface circuit contains the first resolution display data, and the control circuit drives the plurality of data lines of the display panel based on the first resolution display data; and in response to the display panel operating in the first partial panel display mode, the display data frame received by the control circuit from the interface circuit contains the second resolution display data, but does not contain a display data corresponding to other display areas in the display panel except the first partial display area, and the control circuit drives the plurality of data lines based on the second resolution display data.

28. The display apparatus according to claim 27, wherein in response to the display panel operating in a second partial panel display mode, the display data frame received by the control circuit from the interface circuit contains a third resolution display data corresponding to a second partial display area of the display panel, but does not contain a display data corresponding to other display areas in the display panel except the second partial display area, and the control circuit drives the plurality of data lines based on the third resolution display data, wherein a resolution of the third resolution display data is lower than the resolution of the first resolution display data, and the second partial display area is different from the first partial display area.

29. The display apparatus according to claim 27, wherein in the full panel display mode:

the vertical synchronization information defines a frame period, the frame period corresponding to the display data frame comprises a porch period, a first sub-frame scanning period corresponding to the first partial display area, and a second sub-frame scanning period corresponding to a second partial display area of the display panel, wherein the second partial display area is different from the first partial display area;

the control circuit provides a first gate start pulse signal to a first gate scanning circuit corresponding to the first partial display area to trigger the first gate scanning circuit to perform gate scanning on the first partial display area of the display panel during the first sub-frame scanning period; and the control circuit provides a second gate start pulse signal to a second gate scanning circuit corresponding to the second partial display area to trigger the second gate scanning circuit to perform gate scanning on the second partial display area of the display panel during the second sub-frame scanning period.

30. The display apparatus according to claim 29, wherein in the full panel display mode:

the control circuit provides a first emission start pulse signal to a first emission scanning circuit corresponding to the first partial display area to trigger the first emission scanning circuit to perform emission scanning on the first partial display area of the display panel during the first sub-frame scanning period; and the control circuit provides a second emission start pulse signal to a second emission scanning circuit corresponding to the second partial display area to trigger the second emission scanning circuit to perform emission scanning on the second partial display area of the display panel during the second sub-frame scanning period.

31. The display apparatus according to claim 27, wherein in the first partial panel display mode:

the vertical synchronization information defines a frame period, the frame period corresponding to the display data frame comprises a first sub-frame scanning period corresponding to the first partial display area, and a second sub-frame scanning period corresponding to a second partial display area of the display panel, wherein the second partial display area is different from the first partial display area;

the control circuit provides a first gate start pulse signal to a first gate scanning circuit corresponding to the first partial display area to trigger the first gate scanning circuit to perform gate scanning on the first partial display area of the display panel during the first sub-frame scanning period;

the control circuit drives the plurality of data lines during the first sub-frame scanning period based on the second resolution display data;

the control circuit maintains the plurality of data lines in a stable state during the second sub-frame scanning period because there is no display data corresponding to the second partial display area; and the control circuit cancels a second gate start pulse signal provided to a second gate scanning circuit to disable gate scanning on the second partial display area performed by the second gate scanning circuit during the second sub-frame scanning period.

32. The display apparatus according to claim 31, wherein in the first partial panel display mode:

the control circuit provides a first emission start pulse signal to a first emission scanning circuit corresponding to the first partial display area to trigger the first emission scanning circuit to perform emission scanning on the first partial display area of the display panel during the first sub-frame scanning period; and the control circuit cancels a second emission start pulse signal provided to a second emission scanning circuit to disable emission scanning on the second partial display area performed by the second emission scanning circuit during the second sub-frame scanning period.

33. The display apparatus according to claim 32, wherein in the first partial panel display mode:

by providing the first emission start pulse signal, the first partial display area of the display panel operates in a normal display state during the entire frame period; and by canceling the second emission start pulse signal, the second partial display area of the display panel operates in a non-display state during the entire frame period.

34. The display apparatus according to claim 27, wherein in the first partial panel display mode:

the vertical synchronization information defines a frame period, the frame period corresponding to the display data frame comprises a porch period and a first sub-frame scanning period corresponding to the first partial display area, wherein there is no scanning period corresponding to a second partial display area of the display panel during the frame period, and the first partial display area is different from the second partial display area;

the control circuit provides a first gate start pulse signal to a first gate scanning circuit corresponding to the first partial display area to trigger the first gate scanning circuit to perform gate scanning on the first partial display area of the display panel during the first sub-frame scanning period;

the control circuit drives the plurality of data lines during the first sub-frame scanning period based on the second resolution display data; and the control circuit cancels a second gate start pulse signal provided to a second gate scanning circuit to disable gate scanning on the second partial display area performed by the second gate scanning circuit.

35. The display apparatus according to claim 34, wherein in the first partial panel display mode:

the control circuit provides a first emission start pulse signal to a first emission scanning circuit corresponding to the first partial display area to trigger the first emission scanning circuit to perform emission scanning on the first partial display area of the display panel during the first sub-frame scanning period; and the control circuit cancels a second emission start pulse signal provided to a second emission scanning circuit to disable emission scanning on the second partial display area performed by the second emission scanning circuit.

36. The display apparatus according to claim 35, wherein in the first partial panel display mode:

by providing the first emission start pulse signal, the first partial display area of the display panel operates in a normal display state during the entire frame period; and by canceling the second emission start pulse signal, the second partial display area of the display panel operates in a non-display state during the entire frame period.

37. The display apparatus according to claim 27, wherein the control circuit comprises:

at least one processing circuit coupled to the interface circuit to receive the display data frame, wherein the at least one processing circuit performs at least one image processing on the display data frame to generate a processed data frame;

a timing circuit coupled to the at least one processing circuit to receive the processed data frame, wherein the timing circuit controls an operation timing of the control circuit based on the vertical synchronization information; and a source signal control circuit coupled to the timing circuit to receive the processed data frame, wherein in the full panel display mode, the processed data frame received by the source signal control circuit from the timing circuit contains the first resolution display data, and the source signal control circuit drives the plurality of data lines based on the first resolution display data; and in the first partial panel display mode, the processed data frame received by the source signal control circuit from the timing circuit contains the second resolution display data but does not contain a display data corresponding to other display areas except the first partial display area, and the source signal control circuit drives the plurality of data lines based on the second resolution display data.

38. The display apparatus according to claim 37, wherein the vertical synchronization information defines a frame period, the frame period corresponding to the display data frame comprises a porch period, a first sub-frame scanning period corresponding to the first partial display area, a second sub-frame scanning period corresponding to a second partial display area of the display panel, and the control circuit further comprises:

a gate signal control circuit coupled to the timing circuit, wherein in the full panel display mode, the gate signal control circuit provides a first gate start pulse signal to a first gate scanning circuit corresponding to the first partial display area based on a timing control of the timing circuit to trigger the first gate scanning circuit to perform gate scanning on the first partial display area during the first sub-frame scanning period, and provides a second gate start pulse signal to a second gate scanning circuit corresponding to the second partial display area to trigger the second gate scanning circuit to perform gate scanning on the second partial display area during the second sub-frame scanning period; and in the first partial panel display mode, the gate signal control circuit provides the first gate start pulse signal to the first gate scanning circuit based on the timing control of the timing circuit to trigger the first gate scanning circuit to perform gate scanning on the first partial display area during the first sub-frame scanning period, the source signal control circuit drives the plurality of data lines based on the second resolution display data during the first sub-frame scanning period, the gate signal control circuit cancels the second gate start pulse signal to disable gate scanning on the second partial display area performed by the second gate scanning circuit during the second sub-frame scanning period, and the source signal control circuit maintains the plurality of data lines in a stable state during the second sub-frame scanning period because there is no display data corresponding to the second partial display area.

39. The display apparatus according to claim 38, wherein the control circuit further comprises:

an emission signal control circuit coupled to the timing circuit, wherein, in the full panel display mode, the emission signal control circuit provides a first emission start pulse signal to a first emission scanning circuit corresponding to the first partial display area based on the timing control of the timing circuit to trigger the first emission scanning circuit to perform emission scanning on the first partial display area during the first sub-frame scanning period, and provides a second emission start pulse signal to a second emission scanning circuit corresponding to the second partial display area to trigger the second emission scanning circuit to perform emission scanning on the second partial display area during the second sub-frame scanning period; and in the first partial panel display mode, the emission signal control circuit provides the first emission start pulse signal to the first emission scanning circuit based on the timing control of the timing circuit to trigger the first emission scanning circuit to perform emission scanning on the first partial display area during the first sub-frame scanning period, and cancels the second emission start pulse signal to disable emission scanning on the second partial display area performed by the second emission scanning circuit during the second sub-frame scanning period.

40. The display apparatus according to claim 37, wherein the vertical synchronization information defines a frame period, and the control circuit further comprises:

a gate signal control circuit coupled to the timing circuit, wherein in the first partial panel display mode, the frame period corresponding to the display data frame comprises a porch period and a first sub-frame scanning period corresponding to the first partial display area but there is no scanning period corresponding to a second partial display area of the display panel, the gate signal control circuit provides a first gate start pulse signal to a first gate scanning circuit corresponding to the first partial display area based on a timing control of the timing circuit to trigger the first gate scanning circuit to perform gate scanning on the first partial display area during the first sub-frame scanning period, the source signal control circuit drives the plurality of data lines based on the second resolution display data during the first sub-frame scanning period, and the gate signal control circuit cancels a second gate start pulse signal provided to a second gate scanning circuit to disable gate scanning on the second partial display area performed by the second gate scanning circuit.

41. The display apparatus according to claim 40, wherein the control circuit further comprises:

an emission signal control circuit coupled to the timing circuit, wherein, in the first partial panel display mode, the emission signal control circuit provides a first emission start pulse signal to a first emission scanning circuit corresponding to the first partial display area based on the timing control of the timing circuit to trigger the first emission scanning circuit to perform emission scanning on the first partial display area during the first sub-frame scanning period, and cancels a second emission start pulse signal provided to a second emission scanning circuit to disable emission scanning on the second partial display area performed by the second emission scanning circuit.

* * * * *